Dec. 20, 1932.  L. R. KERNS  1,891,544
LUBRICATING DEVICE
Original Filed Feb. 23, 1929
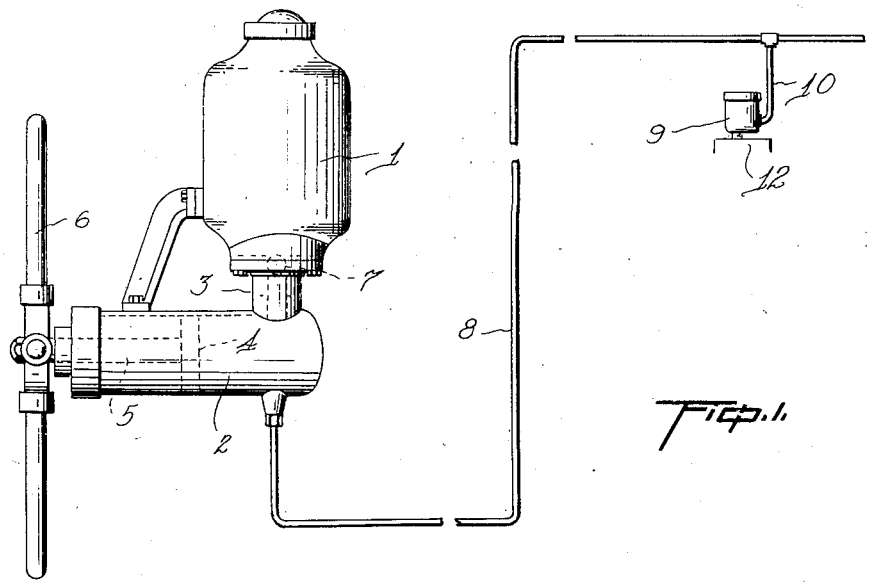
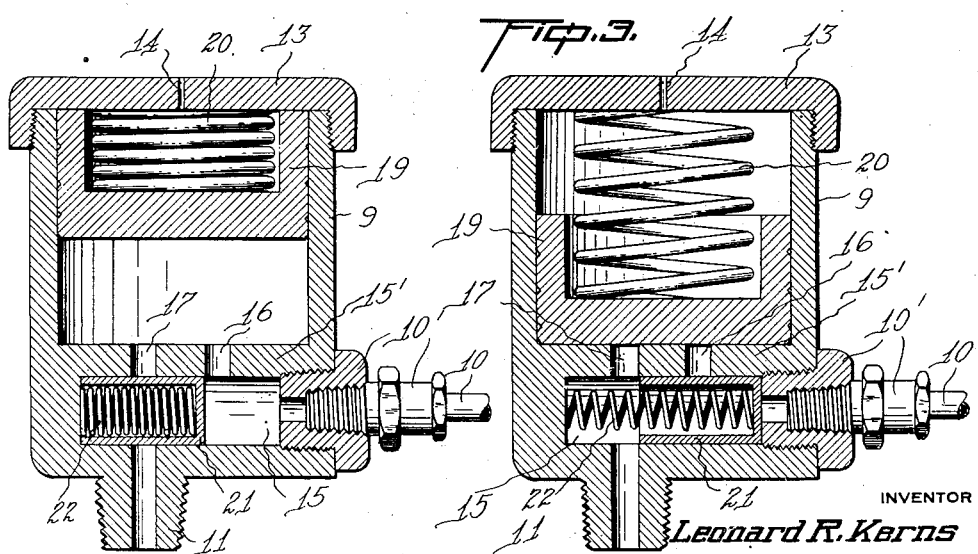
INVENTOR
Leonard R. Kerns
BY
ATTORNEYS Patented Dec. 20, 1932

1,891,544

UNITED STATES PATENT OFFICE

LEONARD R. KERNS, OF CHICAGO, ILLINOIS, ASSIGNOR TO LUBRICATION DEVICES INCORPORATED, OF BATTLE CREEK, MICHIGAN, A CORPORATION OF MICHIGAN

LUBRICATING DEVICE

Application filed February 23, 1929, Serial No. 341,959. Renewed April 6, 1932.

The present invention pertains to a novel lubricating device designed for use in centralized lubricating systems, wherein a plurality of points may be lubricated in a single operation, as shown in my copending application Serial No. 341,957 of even filing date.

The invention is directed more particularly to the means for charging lubricant under pressure into the line leading to the various points to be lubricated.

This device includes a lubricant reservoir communicating with a grease gun in which the pressure is developed. Fluid under pressure is charged from the grease gun into a pump body having a piston therein, and when the pressure is relieved, a spring behind this piston forces the lubricant into the line.

The invention is fully disclosed by way of example in the following description and in the accompanying drawing, in which—

Figure 1 is an elevation of the apparatus;

Fig. 2 is a section of the pump in loading position; and

Fig. 3 is a section of the pump in discharged position.

Reference to these views will now be made by use of like characters which are employed to designate corresponding parts throughout.

In Figure 1 the apparatus is illustrated as including a reservoir 1 for containing a quantity of lubricant and communicating with the cylinder 2 of a grease gun through a neck 3. A piston 4 is slidably mounted in the grease gun and is operated by a threaded piston rod 5 and an exterior handle 6. Between the cylinder 2 and the reservoir 1 is a check valve device 7 which opens by gravity to permit the chamber of the gun to fill and closes by the pressure developed in the cylinder 2 when the piston 4 is moved inwardly.

During such operation of the grease gun the lubricant thus trapped in the chamber of the cylinder is delivered to a pipe 8 communicating with one or a series of pump bodies 9 connected to the line by a branch or branches 10.

The pump body is formed at one end with a threaded nipple 11 which is entered into the bearing 12 or other part to be lubricated. The other end of the body is closed by a cap 13 in which is formed a vent 14.

Directly over the nipple 11, the valve body is formed with a valve chamber 15, one end of which is closed and the other end of which receives fittings 10' for the connection of the branch 10 thereto. The upper wall or partition 15' separating the valve chamber from the main compartment of the body 9 is formed with a loading passage 16 and a discharge passage 17 establishing communication between these two chambers. The main compartment of the body 9 contains a piston 19 slidable therein and normally moved towards the partition 15' by a strong spring 20.

The valve chamber 15 contains a valve 21 adapted in one position to close the passage 17 and uncover the passage 16, and in another position to uncover the passage 17 and close the passage 16. The valve is of sleeve-like formation and contains a compressed spring 22 having one end engaging the closed end of the valve chamber. This spring normally tends to uncover the port 17 and close the port 16 as shown more clearly in Figure 3.

In the operation of the device, the spring pressed members occupy the position shown in Figure 3, as already indicated. When lubricant is forced under pressure from the gun 2 into the line 10 in the manner described, it moves the valve 21 to the position shown in Figure 2, so that the lubricant may enter the piston chamber through the valve chamber 15 and loading port 16. The pressure applied at the gun 2 is sufficient to raise the piston 19 against the action of the spring 20, and the air behind the piston is expelled through the vent 14.

When the piston chamber is filled with lubricant the pressure at the gun is relieved by reversing the handle 6, whereupon the spring 22 returns the valve 21 to the position shown in Figure 3 in which it uncovers the discharge port 17 and closes the loading port 16. The spring 20, which has been compressed in the loading operation, now forces the piston with great pressure towards the partition 15', whereupon the lubricant is expelled from the piston chamber through the port 17, valve chamber 15 and nipple 11 to the bearing.

Although a specific embodiment of the invention has been illustrated and described, it will be understood that various alterations in the details of construction may be made without departing from the scope of the invention, as indicated by the appended claims.

What I claim is:

1. A lubricating device comprising a reservoir, a gun in communication therewith, a pump including a body and a piston reciprocable therein, said body having loading and discharge passages in advance of said piston, a connection from said gun to said loading opening, a spring behind said piston and tending to move the latter towards said passages, and means for obstructing said loading opening by relief of loading pressure therein and for obstructing said discharge opening by pressure in the loading opening, said valve being dimensioned to close either of said passages completely before permitting flow through the other passage.

2. A lubricating device comprising a reservoir, a gun in communication therewith, a pump including a body and a piston reciprocable therein, said body having loading and discharge passages in advance of said piston, a connection from said gun to said loading opening, a spring behind said piston and tending to move the latter towards said passages, and means for obstructing said loading opening by relief of loading pressure therein and for obstructing said discharge opening by pressure in the loading opening, said body having a vent behind said piston, said valve being dimensioned to close either of said passages completely before permitting flow through the other passage.

3. A lubricating device comprising a reservoir, a gun in communication therewith, a pump including a body and a piston reciprocable therein, said body having loading and discharge passages in advance of said piston, a connection from said gun to said loading opening, a spring behind said piston and tending to move the latter towards said passages, a slide valve controlling said passages and adapted to open the loading passage and close the discharge passage on pressure in said connection between said gun and loading passage, and means for moving said valve to a position uncovering said discharge passage and obstructing said loading passage on relief of pressure in said connection, said valve being dimensioned to close either of said passages completely before permitting flow through the other passage.

4. A lubricating device comprising a reservoir, a gun in communication therewith, a pump including a body and a piston reciprocable therein, said body having loading and discharge passages in advance of said piston, a connection from said gun to said loading opening, a spring behind said piston and tending to move the latter towards said passages, a slide valve controlling said passages and adapted to open the loading passage and close the discharge passage on pressure in said connection between said gun and loading passage, and a spring for moving said valve to a position uncovering said discharge passage and obstructing said loading passage on relief of pressure in said connection, said valve being dimensioned to close either of said passages completely before permitting flow through the other passage.

5. A lubricating device comprising a reservoir, a gun in communication therewith, a pump including a body and a piston reciprocable therein, said body having loading and discharge passages in advance of said piston, a connection from said gun to said loading opening, a spring behind said piston and tending to move the latter towards said passages, a slide valve controlling said passages and adapted to open the loading passage and close the discharge passage on pressure in said connection between said gun and loading passage, and a spring for moving said valve to a position uncovering said discharge passage and obstructing said loading passage on relief of pressure in said connection, said body having a vent behind said piston, said valve being dimensioned to close either of said passages completely before permitting flow through the other passage.

6. A lubricating device comprising a reservoir, a gun in communication therewith, a pump including a body and a piston reciprocable therein, said body having a valve chamber formed therein and a wall between said valve chamber and piston chamber, said wall having loading and discharge passages, a spring behind said piston and tending to move the latter towards said passages, said body having a vent behind said piston, a connection between said gun and valve chamber, a slide valve controlling said passages and adapted to open the loading passage and close the discharge passage on pressure in said connection between said gun and loading passage, and means for moving said valve to a position uncovering said discharge passage and obstructing said loading passage on relief of pressure in said connection, said valve being dimensioned to close either of said passages completely before permitting flow through the other passage.

In testimony whereof I affix my signature.

LEONARD R. KERNS.